US011479225B2

(12) United States Patent
Farres et al.

(10) Patent No.: US 11,479,225 B2
(45) Date of Patent: Oct. 25, 2022

(54) HEAVY DUTY VEHICLE REDUNDANT BRAKING SYSTEM

(71) Applicant: Volvo Truck Corporation, Gothenburg (SE)

(72) Inventors: Lionel Farres, Heyrieux (FR); Xavier Blanc, Chassieu (FR)

(73) Assignee: Volvo Truck Corporation, Gothenburg (SE)

( * ) Notice: Subject to any disclaimer, the term of this patent is extended or adjusted under 35 U.S.C. 154(b) by 95 days.

(21) Appl. No.: 17/051,935

(22) PCT Filed: May 3, 2018

(86) PCT No.: PCT/EP2018/061314
§ 371 (c)(1),
(2) Date: Oct. 30, 2020

(87) PCT Pub. No.: WO2019/210956
PCT Pub. Date: Nov. 7, 2019

(65) Prior Publication Data
US 2021/0122350 A1 Apr. 29, 2021

(51) Int. Cl.
*B60T 13/68* (2006.01)
*B60T 8/17* (2006.01)
(Continued)

(52) U.S. Cl.
CPC .............. *B60T 13/683* (2013.01); *B60T 8/17* (2013.01); *B60T 13/268* (2013.01);
(Continued)

(58) Field of Classification Search
CPC ........ B60T 13/683; B60T 15/027; B60T 8/17; B60T 17/221; B60T 13/268; B60T 7/042;
(Continued)

(56) References Cited

U.S. PATENT DOCUMENTS 5,116,107 A * 5/1992 Hull ...................... B60T 13/263
303/54
6,375,281 B1 * 4/2002 Angerfors ............... B60T 8/327
303/7
(Continued)

FOREIGN PATENT DOCUMENTS

DE 102013015157 A1 * 3/2015
EP 2794368 B1 11/2015
(Continued)

OTHER PUBLICATIONS

International Search Report and Written Opinion for PCT/EP2018/061314, dated Feb. 20, 2019, 8 pages.

*Primary Examiner* — Pamela Rodriguez
(74) *Attorney, Agent, or Firm* — Withrow & Terranova, PLLC

(57) ABSTRACT

Electronically controlled pneumatic brake system and method for an automotive vehicle, said system comprising a front axle brake module (FBM) for providing pneumatic control pressure to the left and right front pneumatic brake actuators (FW-L, FW-R), one or more rear axle brake module (RBM) for providing pneumatic control pressure to the left and right rear pneumatic brake actuators (RW-L, RW-R), an air production module (6) selectively providing air under pressure to said front and rear axles electronic brake modules via a first air supply circuit (AC1) for the rear axle, a second air supply circuit (AC2) for the front axle, first and second air reservoirs (R1,R2), respectively coupled to first and second air supply circuits, and a third reservoir (R3) and a third air supply circuit (AC3) connected to the third reservoir (R3), for providing a redundant pneumatic supply to the front and rear axle brake modules, the third air supply circuit (AC3) providing same braking performance as the first air supply circuit (AC1) for the rear axle and same (Continued)

braking performance as the second air supply circuit (AC2) for the front axle.

15 Claims, 7 Drawing Sheets

(51) Int. Cl.
    *B60T 13/26*     (2006.01)
    *B60T 15/02*     (2006.01)
    *B60T 17/22*     (2006.01)
    *B60T 7/04*     (2006.01)

(52) U.S. Cl.
    CPC .......... *B60T 15/027* (2013.01); *B60T 17/221* (2013.01); *B60T 7/042* (2013.01); *B60T 2240/00* (2013.01); *B60T 2270/402* (2013.01); *B60T 2270/406* (2013.01); *B60T 2270/413* (2013.01); *B60T 2270/88* (2013.01)

(58) Field of Classification Search
    CPC .......... B60T 2270/402; B60T 2270/88; B60T 2270/406; B60T 2240/00; B60T 2270/413
    See application file for complete search history.

(56) References Cited

U.S. PATENT DOCUMENTS

2011/0144855 A1*   6/2011   Herges .................. B60T 13/683
                                                               701/29.1
2019/0337502 A1*  11/2019  Farres ...................... B60T 7/20

FOREIGN PATENT DOCUMENTS

| WO | 99/24299 A1 | 5/1999 |
|---|---|---|
| WO | 2009/152982 A2 | 12/2009 |
| WO | 2013/093545 A1 | 6/2013 |
| WO | WO-2019210964 A1 * | 11/2019 |

* cited by examiner

HEAVY DUTY VEHICLE REDUNDANT BRAKING SYSTEM

This application is a 35 USC 371 national phase filing of International Application No. PCT/EP2018/061314, filed May 3, 2018, the disclosure of which is incorporated herein by reference in its entirety.

FIELD OF THE INVENTION

This invention relates to an electronically controlled pneumatic brake system for an automotive vehicle. This invention also relates to an automotive vehicle equipped with such a system.

BACKGROUND OF THE DISCLOSURE

In the field of automotive vehicles, reliable trajectory control is among the prominent safety features required for ensuring smooth and secure traffic on roads. More particularly, steering and braking functions are of utmost importance.

The present disclosure focuses more particularly on the braking function, which relies, in particular for trucks, and more generally for heavy duty vehicles, on an electro-pneumatic system using air under pressure as working fluid.

It has been made compulsory for long to provide two independent pneumatic circuits, as a redundant arrangement in order to keep a braking capability in case one circuit undergoes a failure.

Later, solutions using electric control on top of baseline pneumatic system were introduced to speed up pressure changes at axles, so the effective control at brake actuators can reflect driver controls in a more real time fashion.

More recently, a trend to go towards brake-by-wire solutions has lead the trucks designers to simplify the foot pedal brake unit by removing all the pneumatic components from the foot pedal unit, as taught in EP2794368. However, reliability and tolerance to failure(s) must still be ensured, especially in the area of electrical controls and pneumatic controls.

Now, with the outlook of autonomous vehicles and vehicle automation, the inventors have endeavored to find new solutions for providing redundant electro-pneumatic braking systems, with the goal of making available compressed air to pneumatic wheel brake actuators, maintaining normal braking capability even though one pneumatic circuit has a problem.

SUMMARY OF THE DISCLOSURE

According to one aspect of the present invention, it is disclosed an electronically controlled pneumatic brake system for an automotive vehicle, said system comprising:
 one or more front axle brake module (FBM) for providing pneumatic control pressure to the left and right front pneumatic brake actuators (FW-L, FW-R),
 one or more rear axle brake module (RBM) for providing pneumatic control pressure to the left and right rear pneumatic brake actuators (RW-L,RW-R),
 an air production module (6) selectively providing air under pressure to said axles electronic brake modules (FBM,RBM) via at least a first air supply circuit (AC1) for the rear axle and a second air supply circuit (AC2) for the front axle,
 first and second air reservoirs (R1,R2), respectively coupled to first and second air supply circuits, characterized in that the system comprises a third reservoir (R3) and a third air supply circuit (AC3), connected to the third reservoir (R3), for providing a redundant pneumatic supply to the front axle brake module (FBM) and to the rear axle brake module (RBM) wherein the third air supply circuit (AC3) provides substantially the same braking performance as the first air supply circuit (AC1) for the rear axle at nominal conditions and/or substantially the same braking performance as the second air supply circuit (AC2) for the front axle at nominal conditions.

Thanks to this arrangement, it is possible to provide full pneumatic redundancy.

Even though one pneumatic circuit might happen to be unavailable, a 100% braking performance remains available.

The notion of 100% braking performance (with relating number of brake applications and braking power) is defined by braking performance standards and requirements as set out in UN ECE R13 § (§ 2.1 of Annex 4 BRAKING TESTS AND PERFORMANCE OF BRAKING SYSTEMS) and USA CFR § 571.121 "Air brake systems: S5.3.1 Stopping distance—trucks and buses".

Said otherwise, there is no loss of braking performance whenever one pneumatic circuit becomes unavailable.

Moreover, the unavailable circuit can also be identified and this condition can be notified to the driver or to a remote site, in order to prompt for service and problem resolution.

In various embodiments of the invention, one may possibly use in addition to one and/or other of the following arrangements, taken alone or in combination.

According to one aspect, the system advantageously comprises a first overflow valve (31) arranged at the head section of the first air supply circuit (AC1), and a second overflow valve (32) arranged at the head section of the second air supply circuit (AC2), wherein each of the overflow valves (31,32) exhibits an open state and a close state. Whereby, these overflow valves form convenient means for isolating a leaking pneumatic circuit, such that the two remaining pneumatic circuits can carry on proper operation under nominal pressure conditions.

According to one aspect, the system advantageously comprises a first control solenoid (41), with its output coupled to the first overflow valve (31), and configured to change the first overflow valve (31) to its close state when pressure is applied from the first control solenoid to the first overflow valve, and a second control solenoid (42), with its output coupled to second overflow valve (32) and configured to change the second overflow valve (32) to its close state when pressure is applied from the second control solenoid to the second overflow valve.

Whereby, each of the overflow valves can be controlled actively and selectively by a relevant control solenoid in order to close in an early manner a leaking pneumatic circuit, without waiting for the mechanical closure.

According to one aspect, the system advantageously comprises a first pressure sensor (91) arranged on the first air supply circuit (AC1) and a second pressure sensor (92) arranged on the second air supply circuit (AC2).

Whereby, each pressure in first and second air supply circuits can be monitored and if there is one leak in one air supply circuit, this can be determined from the air pressure information monitoring. The lowest pressure value denotes the leaking circuit, notably outside braking phase(s), without excluding analysis during braking phases.

According to one aspect, the air production module (6) comprises a control unit (61) configured to control the first and second control solenoids (41,42), in accordance with the values of the pressure sensed at the first and second pressure sensors (91,92).

Whereby, the air production module provides mechanical protection against shocks and fluids. Also, the air production module provides independence from the other control units, i.e. brake control unit (73) and the autonomous drive control units (71,72).

According to one aspect, the first and second control solenoids (41,42) are pneumatically supplied by a trunk portion (AC0) of the air production module (6). Thereby, the control solenoids are still properly supplied by air even though there is one substantial outstanding leakage in one of the first or second air circuit.

According to one aspect, the third reservoir (R3) has a volume (VR3) which is not less than the volume of the first air reservoir (R1) and not less than the volume of the second air reservoir (R2). This volume represents advantageously enough air reserve to provide a substitute air source for achieving 100% nominal braking performance over required time and/or number of brake applications (no loss of braking performance in case either AC1 or AC2 is out of order).

According to one aspect, the system may further comprise a third overflow valve (3) arranged at the head section of the third circuit (AC3). Therefore, the third circuit can also be isolated from the two basic circuits (AC1,AC2) in case of leakage of the third circuit.

According to one aspect, the system may further comprise a third control solenoid (43), with its output coupled to the third overflow valve (33), and configured to change the third overflow valve (3) to its close state when pressure is applied from the third control solenoid to the third overflow valve.

Whereby, each of the three overflow valves can be controlled actively and selectively by a relevant control solenoid in order to close in an early manner one leaking circuit out of the three available pneumatic circuits, without waiting for the mechanical closure, including for the third redundant circuit.

According to one aspect, the system may further comprise at least a first double check valve (20R) configured such that the rear axle electronic brake module (RBM) is supplied by the first air supply circuit (AC1) and the third air supply circuit (AC3) through the first double check valve (20R), and a second double check valve (20F) configured such that the front axle electronic brake module (FBM) is supplied by the second air supply circuit (AC2) and the third air supply circuit (AC3) through the second double check valve (20F).

This forms a simple, efficient and robust solution for providing redundancy regarding air supply at the axle modules.

According to one aspect, the system may further comprise a pressure sensor (90) on the trunk portion AC0. Whereby, the accuracy of the detection of leakage can be improved; possible variations of pressure at the trunk portion can be taken into account and subtracted from pressure measured at the first and second circuits, therefore giving a better differential mode, and better independence from extraneous effects (including air consumption from truck ancillaries/auxiliaries).

According to one aspect, there may be provided one axle electronic brake module (FBM,RBM) per axle. This provides optimization of resources for braking function.

According to one aspect, there may be provided one axle electronic brake module (FBM,RBM) per braked wheel or braked pair of twin-wheel. This provides increased independence and therefore redundancy.

The invention is also directed to a method to control overflow valves in an electronically controlled pneumatic brake system for an automotive vehicle, said system comprising:
one or more front axle brake module (FBM) for providing pneumatic control pressure to the left and right front pneumatic brake actuators (FW-L, FW-R),
one or more rear axle brake module (RBM) for providing pneumatic control pressure to the left and right rear pneumatic brake actuators (RW-L,RW-R),
an air production module (6) selectively providing air under pressure to said front and rear axles electronic brake modules (FBM,RBM) via at least a first air supply circuit (AC1) coupled to a first and second air reservoir (R1) for the rear axle, a second air supply circuit (AC2) coupled to a second air reservoir (R2) for the front axle, and a third air supply circuit (AC3) connected to the third reservoir (R3), for providing a redundant pneumatic supply to the front axle brake module (FBM) and to the rear axle brake module (RBM),
a first pressure sensor (91) configured to measure prevailing pressure in the first air supply circuit (AC1),
and a second pressure sensor (92) configured to measure prevailing pressure in the second air supply circuit (AC2),
a first overflow valve (31) arranged at the head section of the first air supply circuit (AC1),
a second overflow valve (32) arranged at the head section of the second air supply circuit (AC2), wherein each of the overflow valves (31,32) exhibits an open state and a close state.
a first control solenoid (41), with its output coupled to the first overflow valve (31), and configured to change the first overflow valve (31) to its close state when pressure is applied from the first control solenoid to the first overflow valve,
a second control solenoid (42), with its output coupled to second overflow valve (32) and configured to change the second overflow valve (32) to its close state when pressure is applied from the second control solenoid to the second overflow valve,
the method comprising:
S1/ monitoring, by a control unit (61), over time, via the first and second pressure sensors (91,92), pressure prevailing in the first and second air supply circuits (AC1,AC2),
S2/ whenever first or second pressure (P1,P2) meets a pressure loss criterion, controlling the respective control solenoid (41,42) to cause the respective overflow valve (31,32) to close and remain closed,
whereby a leaking circuit among AC1,AC2 is isolated from the two other air supply circuits, and the two remaining air supply circuits provide a 100% braking performance with regard to standard braking performance (number of brake applications and braking power) as already defined above.

According to one aspect of the method, the pressure loss criterion is defined as when a pressure difference between first and second pressure (P2−P1) is greater than a predefined threshold, and under this condition, the circuit exhibiting the lower pressure value is determined to be the leaking circuit and the corresponding control solenoid (41, 42) is controlled to close the respective overflow valves (31,32). Thereby, a simple and reliable method is proposed to perform an early pneumatic isolation of a leaking circuit.

According to one aspect of the method, the pressure loss criterion is defined as a pressure gradient, and under this condition, the circuit exhibiting the higher pressure gradient is determined to be the leaking circuit and the corresponding control solenoid (41,42) is controlled to close the respective overflow valve (31,32). Thereby, another simple and reliable method is proposed to perform an early pneumatic isolation of a leaking circuit.

According to one aspect, the method may comprise a test routine whenever in case a loss of pressure occurs, the control unit (61) does sequentially:

S3/ power first control solenoid (41) to cause the first overflow valve (31) to close, and the control unit (61) monitors the first pressure (P1) and if the loss of pressure on first pressure continues for a predetermined time then maintain power on first control solenoid (41) to keep the first overflow valve (31) closed, otherwise unpower first control solenoid (41), S4/ power second control solenoid (42) to cause the second overflow valve (32) to close, and the control unit (61) monitors the second pressure (P2) and if the loss of pressure on second pressure continues for a predetermined time then maintain power on second control solenoid (42) to keep the second overflow valve (32) closed, otherwise unpower second control solenoid (42).

This enhances reliability of the detection, which can provide confirmation of the above tests. With such test routine, the detection algorithm is less dependent on possible pneumatic compressor oscillations and less dependent on extraneous effects (including air consumption from truck ancillaries/auxiliaries).

The invention is also directed to a vehicle including a brake system as described above.

BRIEF DESCRIPTION OF THE DRAWINGS

Other features and advantages of the invention appear from the following detailed description of two of its embodiments, given by way of non-limiting example, and with reference to the accompanying drawings, in which.

DETAILED DESCRIPTION OF THE DISCLOSURE

In the figures, the same references denote identical or similar elements. Unless stated otherwise, the pneumatic lines are shown thicker than the electrical lines.

Figure 1:
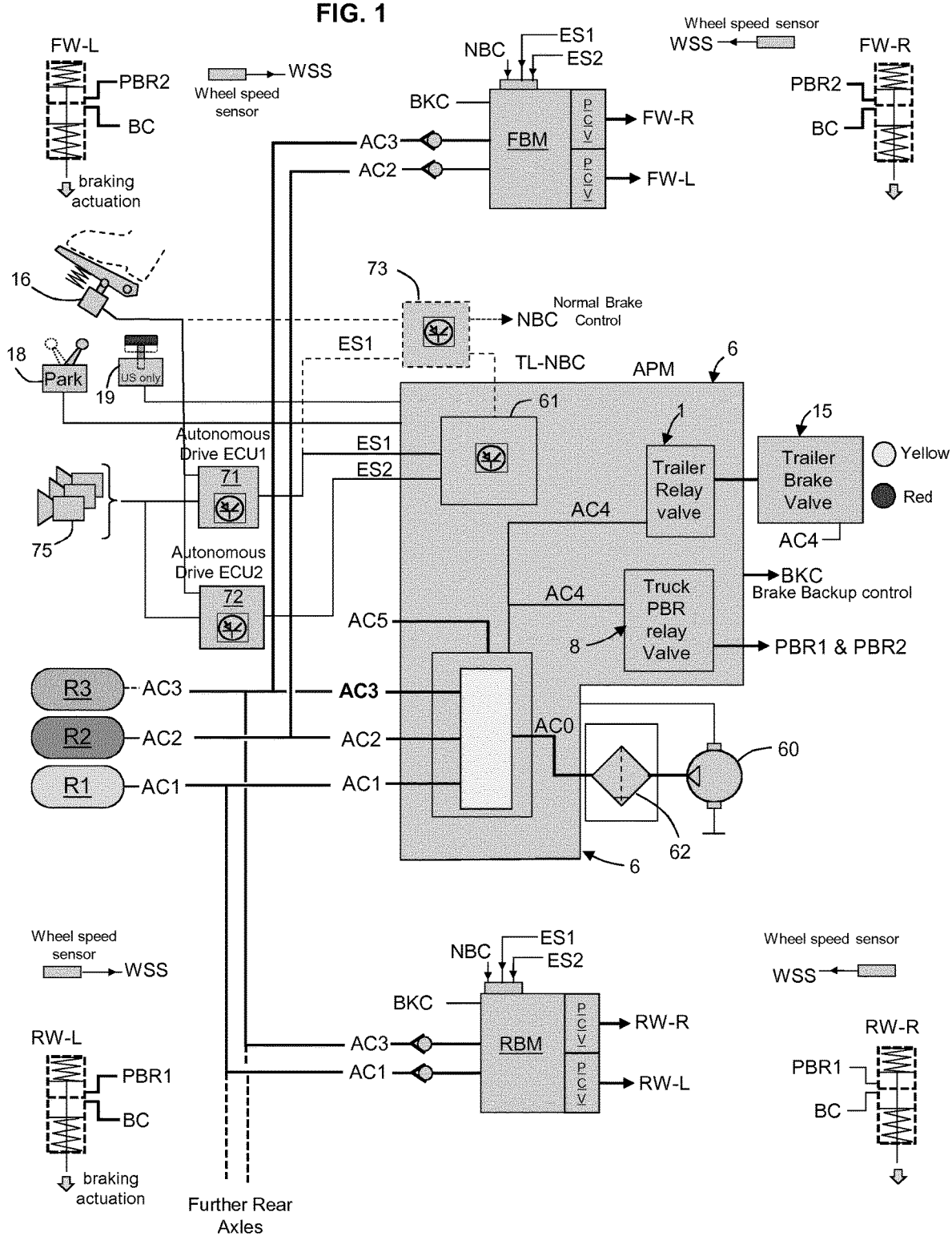
FIG. 1 illustrates a diagrammatical circuit layout of an electro-pneumatic braking system for a truck according to the invention.

FIG. 1 shows a diagrammatical circuit layout of an electro-pneumatic braking system for a truck. The proposed configuration is also valid for any kind of heavy-duty vehicles including buses and coaches.

The truck considered here can be the traction unit in a tractor/trailer configuration or it can be a utility 'carrier' truck.

At least one front axle is a steering axle, without excluding other axle(s) having a steering function including a rear axle.

The truck considered here can have one more level(s) of autonomous drive functionalities, entailing reinforced needs for redundancy in braking systems.

Overview of the Braking System

Figure 7:
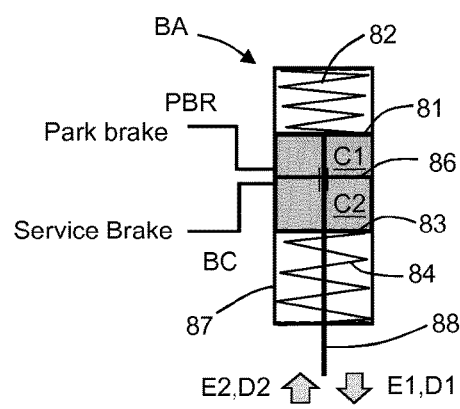
FIG. 7 illustrates a brake pneumatic actuator.

Here we describe the braking system from the wheel to the source. For the sake of clarity we have represented the same brake actuator for all the wheels, but of course, there may be variations and difference according to the location of the wheel (front, rear, trailer etc. . . . ) As known per se, all truck brakes actuators (RW-L, RW-R, FW-L, FW-R) can be combined service brake and park brake actuators. As shown in FIG. 7 each brake actuator (generically referred to as BA) includes a first piston 81 loaded by a first spring 82 which exerts a first effort E1 in a first direction D1. Brake actuator BA also includes a second piston 83 loaded by a second spring 84 which exerts a second effort E2 in a direction D2 opposite to direction D1. Piston 83 is rigid with an output rod 88 of the brake actuator which drives an associated brake mechanism (brake pads, disc, etc. not shown). A fixed wall 86 is mounted within a housing 87 of the brake actuator. Wall 86 defines, respectively with pistons 81 and 83, two chambers C1, C2 of a variable volume. The rod 88 is coupled to the piston 83, crosses the wall 86 in an air tight manner and is coupled to the piston 81. Springs 82 and 84 are chosen so that effort E1 is larger than effort E2. Thus, in absence of air pressure within chambers C1 and C2, effort E1 pushes piston 81 in direction D1. This effort is transmitted by piston 83 to rod 88 to actuate the associated brake mechanism in a first direction. Under such circumstances, the brake mechanism engages the brake disk(s) or drum(s) of the associated rear left wheel or wheels. This corresponds to a park brake actuation for truck. In other words, when no air under pressure is provided to brake actuator BA, the park brake of truck is actuated. Instead of pistons, flexible membranes or diaphragms can be used.

When air under pressure is provided to chamber C1 supplied by input PBR (Parking Brake Release, respectively PBR2 or PBR1 for front and rear), the air pressure within this chamber pushes piston 81 against the action of spring 82 and spring 84 pushes piston 83 in direction D2. This corresponds to the release of the park brake of truck by air pressure.

When the park brake has been released and if air under pressure is provided to chamber C2 supplied by input BC (Brake control), the air pressure within chamber C2 pushes piston 83 in direction D1 which progressively actuates the brake mechanism in order to brake the corresponding wheel or wheels. The mechanical effort delivered by the actuator to the brake mechanism increases with the air pressure delivered to chamber C2. This corresponds to the actuation of the service brake of the truck. The service brake actuator is the device which transforms the air pressure into a mechanical force.

The Trailer brake actuator can be similar to the truck brake actuator.

There may be provided more than 4 brake actuators, in case there are two front axles, and/or two or more rear axles. The number of brake actuators can amount to 2, 4, 6, 8, or more. It is worth noting that some brake actuators can be deprived of the parking brake function. The number of brake actuators can be twice the number of axles.

In the illustrated example, each axle or group of axles is equipped with a brake module, e.g. in the illustrated example a front axle brake module FBM and one (or more) rear axle brake module RBM.

However, in other configurations (not shown), there may be provided one such brake module per wheel or one such brake module per twin wheels.

The front axle brake module FBM provides pneumatic control pressure to the left and right front pneumatic brake actuators (FW-L, FW-R). The rear axle brake module RBM provides pneumatic control pressure to the left and right rear pneumatic brake actuators (RW-L, RW-R).

Each of the front and rear axle brake modules (FBM, RBM) is an electro-pneumatic device, known per se, providing a pneumatic relay function. In short, it selectively takes air from the compressed air supply and selectively releases air to the atmosphere while following faithfully the control signals (electrical and/or pneumatic); its output is connected to the chamber C2 of the corresponding brake actuator BA.

There are provided a first air supply circuit AC1 and a second air supply circuit AC2. Further there is provided a third air supply circuit AC3.

There is provided a first air reservoir R1 coupled to the first air supply circuit AC1.

There is provided a second air reservoir R2 coupled to the second air supply circuit AC2.

There is provided a third air reservoir R3 coupled to the third air supply circuit AC3.

Said otherwise, there are provided three air reservoirs (R1, R2, R3 also called 'vessels'), respectively connected to first, second and third air supply circuits (AC1, AC2, AC3), which are designed to be independent from one another. First and second air supply circuits AC1, AC2, have a service pressure set around 12 bars. In practice, first and second air supply circuits AC1, AC2, may have a service pressure comprised in the range [5 bars 15 bars], preferably comprised in the range [7 bars 12 bars].

Third air supply circuit AC3 may have the same service pressure set around 12 bars. However, as will be seen later, the behavior of the third air supply circuit AC3 can be different, notably regarding the overflow valve.

The first air supply circuit AC1 provides air under pressure to the rear axle brake module RBM. The second air supply circuit AC2 provides air under pressure to the front axle brake module FBM. AC1 is sometimes called 'primary' circuit, AC2 is sometimes called 'secondary' circuit, since rear brakes are usually more powerful than front brakes. The third air supply circuit AC3 provides a redundant air supply both to the front and rear axle brake modules FBM, RBM.

As shown in FIG. 1, the rear axle brake module RBM is supplied both by first air supply circuit AC1 and third air supply circuit AC3, redundancy in air supply is handled within the rear axle brake module RBM. In a similar way, the front axle brake module FBM is supplied both by second air supply circuit AC2 and third air supply circuit AC3, redundancy in air supply is handled within the front axle brake module FBM.

Figure 3:
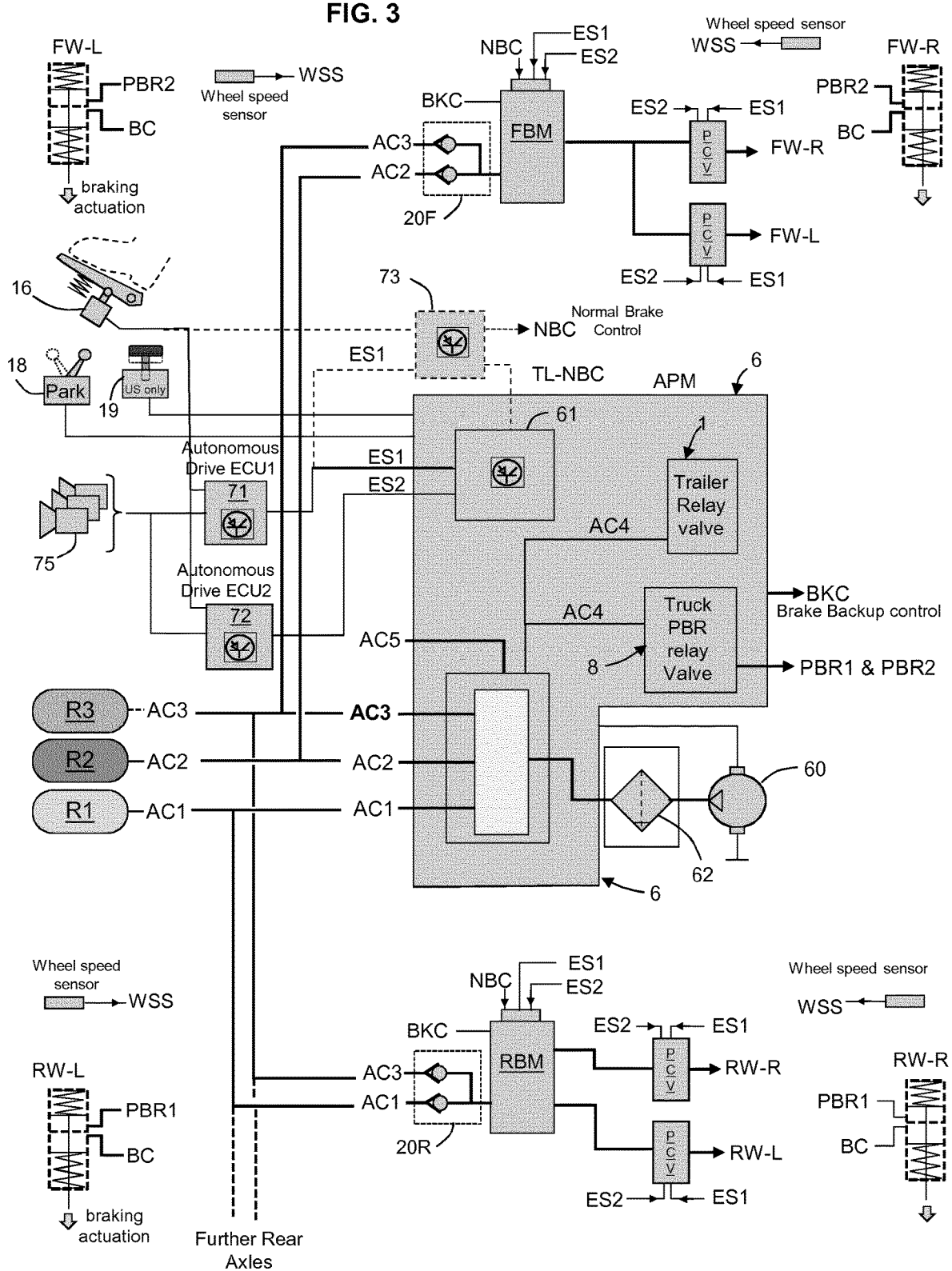
FIG. 3 is similar to FIG. 1 and shows a variant embodiment.

As shown in FIG. 3, according to a variant embodiment, for the rear section, a first double check valve 20R is arranged at the vicinity the rear axle brake module RBM. RBM is supplied by the higher pressure of AC1 or AC3. For the front section, a second double check valve 20F is arranged at the vicinity the front axle brake module FBM. FBM is supplied by the higher pressure of AC2 or AC3.

There is provided an air compressor 60, for compressing air taken from the environment; the output of the compressor goes through a filter/dryer 62; These components are known per se thus not described in detail here.

There are provided here various control units, namely a 'conventional' brake control unit 73, and one or two autonomous drive ECUs 71, 72.

The brake system comprises a service brake electric input device 16 (formed generally as a brake foot pedal) delivering a first input electric signal S16. The brake system comprises one or more electronic brake control units (71, 72, 73) adapted to process the first input electric signal S16, and to deliver one or more electrical control signals (NBC, ES1, ES2) to the front and rear axle brake modules FBM,RBM.

Depending on the level of autonomous drive capability, there may be provided a conventional brake control unit 73, in charge of handling electric signal S16 from the brake foot pedal, and in charge of delivering a braking control signal (named here NBC for normal brake control) to users such as FBM, RBM, trailer circuit (TL-NBC).

According to one example, electrical control signals delivered by first autonomous drive control unit 71 are denoted ES1, electrical control signals delivered by second autonomous drive control unit 72 are denoted ES2.

First and second electrical control signals ES1,ES2 can be formed as conventional electrical control signals (wired solution) or can be formed as equivalent databus messages circulating on an onboard multiplex bus (CAN, Ethernet, LIN etc).

First and second autonomous drive control units 71,72 rely on at least on cameras 75 which provides a flow of images S75 which are analyzed in autonomous drive control units 71,72. There may be provided other types of sensors like radars, lidars or the like, inertial sensors, and also communication data received from various traffic aware entities (from fixed or mobile entities).

As apparent from FIG. 1 and FIG. 3, each of the front and rear axle brake modules FBM, RBM can be either in one integrated unit or in 3 physical units, with the PCV (pressure control valve) separated from the pneumatic relay function.

The PCV (pressure control valve) performs anti-locking function (ABS function). PCV has a first valve in a series arrangement that can block the passage of air down to the brake chamber, and a second valve that can take out air from the brake chamber circuit and release it to the atmosphere. These valves are controlled in accordance with the real time analysis of the speed of each wheel.

As shown in FIG. 1, the PCV (pressure control valve) are separated from the FBM which performs mainly a relay function (electrical+pneumatic control for this relay function).

As shown in FIG. 3, the PCV (pressure control valve) are integrated in the FBM and RBM respectively. Of course mixed configuration is possible.

There are provided wheel speed sensors WSS, at least one per braked wheel. Four are shown in the figures, but having more wheel speed sensors is possible.

The signals from the wheel speed sensors WSS are analyzed at one or more control unit which delivers output signals to control the valves of the respective PCV (pressure control valve). The control unit in charge of ABS regulation can be a local control unit within the front and rear axle brake modules FBM, RBM; it can also be the conventional brake control unit 73; it can also be one or both of the autonomous drive ECUs 71, 72.

APM and its Relay Valves and Other Auxiliaries

There is provided an air production module 6 ('APM' in short), preferably housing components inside a protective enclosure, thereby providing protection against mechanical and fluid attacks. The air production module 6 is located behind the cabin, accessible from one side of the truck for carrier type truck, or accessible from top side if/when the cabin is tilted or rocked. The air production module 6 may comprise various valves, solenoids, relay valves, pressure sensor and a control unit 61.

The air production module 6 houses the core of the parking brake function and comprises the truck PBR relay valve 8. As known per se, there is provided a parking brake electric input device 18 outputting an electric signal S18, which is delivered to the control unit 61 of the APM 6.

There may be provided, with regard to the USA standard, an additional braking handle 19 ('red knob') in relation with the trailer brake control. A corresponding electric signal S19 is delivered to the control unit 61 of the APM 6.

For the air under pressure, coming from the compressor and filter, there is provided a trunk portion AC0. The trunk portion AC0 distributes air through overflow valves (detailed later) to the first and second air supply circuits AC1, AC2, and to the third air supply circuit AC3.

Additionally, the trunk portion AC0 distributes air through an overflow valve to another air supply circuit denoted AC4 for supplying the truck PBR relay valve 8 and a trailer relay valve 1. The output of the trailer relay valve 1 is coupled downstream to a trailer brake valve 15. Each air supply APM line for trailer relay valve 1 and for PBR relay valve 8 can also be protected by a dedicated overflow valve (not shown in figure).

Figure 2:
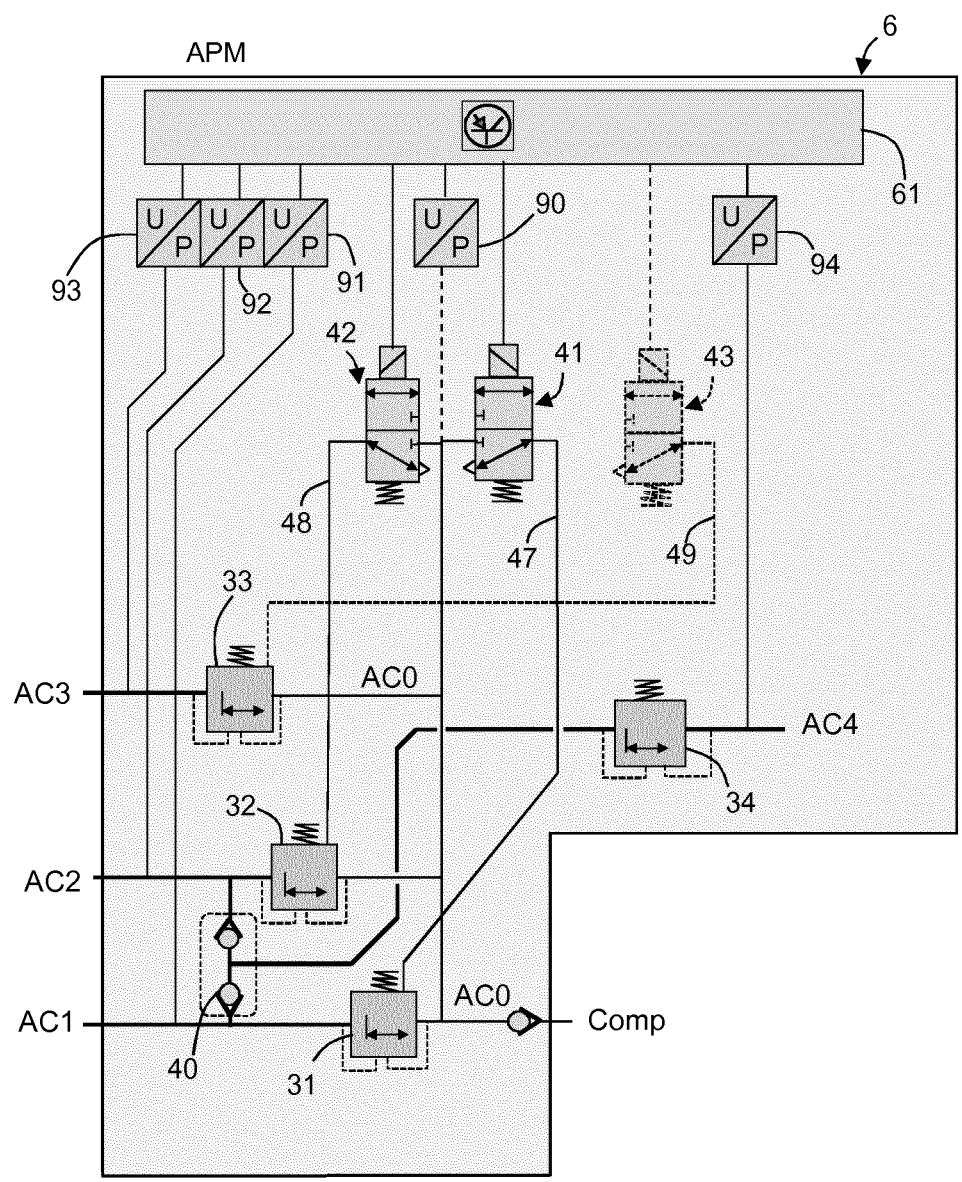
FIG. 2 shows a more detailed view of a portion of the air production module.

As illustrated in FIG. 2, the fourth air circuit AC4 is supplied by a double check valve having one inlet port connected to first air supply circuit AC1 and a second inlet port connected to second air supply circuit AC2.

Optionally, there may be provided another air supply circuit denoted AC5 for supplying the air suspension system and possibly other truck ancillaries/auxiliaries. In addition, the air production module 6 may comprise various simple or double check valves, pressure limiters, purge circuits and likewise devices, etc. . . . .

Overflow Valves

As shown in FIG. 2, the air production module 6 comprises a first overflow valve 31 which is arranged in series at the head section of the first air supply circuit AC1, and a second overflow valve 32 which is arranged in series at the head section of the second air supply circuit AC2.

Additionally, there may be provided optionally a third overflow valve 33 which is arranged in series at the head section of the third air supply circuit AC3.

Additionally, there may be provided optionally a fourth overflow valve 34 which is arranged in series at the head section of the fourth air supply circuit AC4, designed to supply the truck parking brake relay valve 8 and the trailer relay valve 1 (FIG. 1).

Figure 6A:
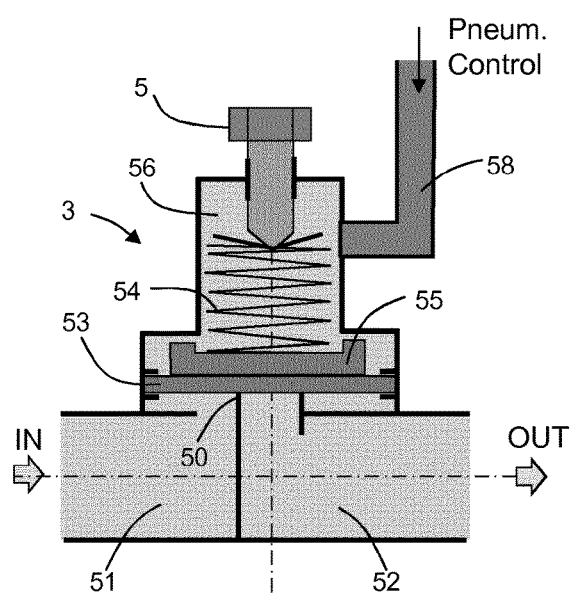
FIGS. 6A and 6B illustrate embodiments of an overflow valve.
Figure 6B:
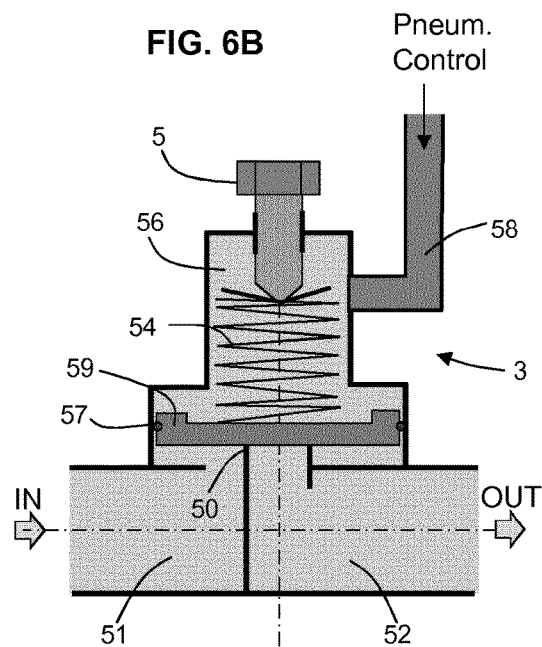

As illustrated in FIGS. 6A and 6B, each overflow valve comprises an input port 51 and an output port 52.

Each overflow valve (denoted 3 as a generic reference) comprises a spring-loaded member biased against a closing seat by an adjustable screw 5. The adjustable screw 5 presses against a spring 54 which in turn presses against the spring-loaded member.

In the membrane configuration (FIG. 6A), the spring-loaded member is a flexible membrane 53 and there is provided an armature 55 to receive one end of the spring 54.

In the piston configuration (FIG. 6B), the spring-loaded member is a movable piston 59, having at its outer periphery a sealing gasket 57.

Additionally, there is also provided a pneumatic control line 58, which when pressurized causes the spring-loaded member to close on the tight seat 50, thereby preventing air from going from input port 51 to output port 52.

Referring to FIG. 2, the first overflow valve 31 is controlled by a first solenoid valve 41 through pneumatic control line 47. The second overflow valve 32 is controlled by a second solenoid valve 42 through a second pneumatic control line 48.

Optionally, the third overflow valve 33 can be controlled by a third solenoid valve 43 through pneumatic control line 49.

However, in a preferred embodiment, there is no third solenoid valve to control the third overflow valve 33; but instead the adjustable screw 5 of the third overflow valve 33 is with higher threshold for opening and/or closure. In the case of a high enough mechanical closure pressure level of the third overflow valve 33, even though there might be a leakage at the third air supply circuit AC3, the third overflow valve 33 will close in a pressure range compatible with keeping 100% desired braking performance on the two other air supply circuits.

All the above mentioned overflow valves and solenoid valves are preferably housed within the air production module 6, where they are protected against environment conditions.

Figure 9:
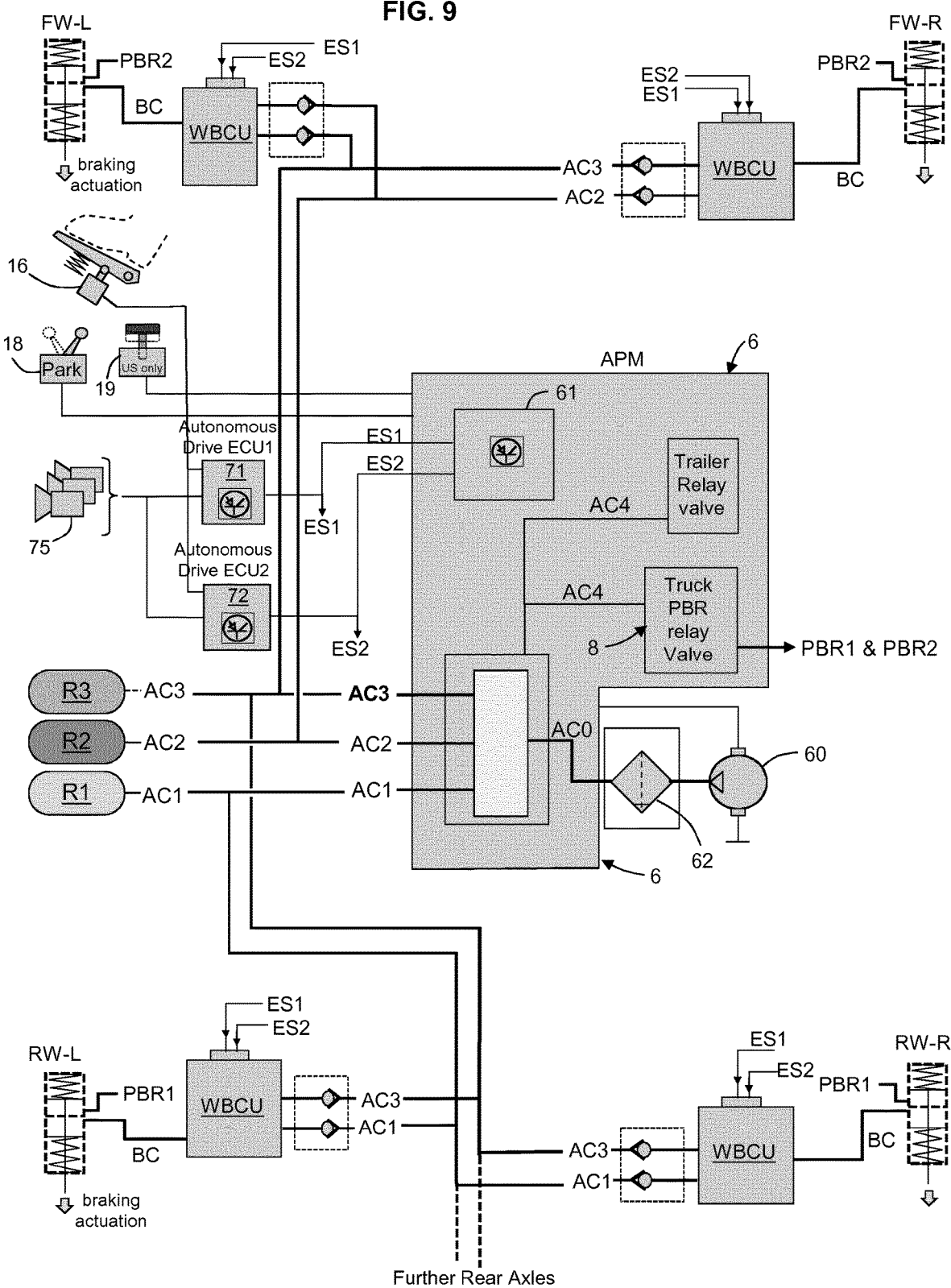
FIG. 9 is similar to FIG. 1 and shows a variant embodiment.

Under normal operation (with no pneumatic control at line 58), the overflow valves remain open. Only when the pressure in one downstream air circuit (AC1,AC2,AC3, AC4) happen to be lower than the closure threshold of the corresponding overflow valve, this overflow valve closes. The closure threshold is generally set around 4.5 to 6 bars, namely substantially lower than the normal service pressure, e.g. 12 bars. FIG. 9, commented later on, gives an example.

The air production module also comprises a first pressure sensor 91 arranged on the first air supply circuit AC1 and a second pressure sensor 92 arranged on the second air supply circuit AC2.

Additionally, there may be provided optionally a third pressure sensor 93 arranged on the third air supply circuit AC3.

Additionally, there may be provided optionally a fourth pressure sensor 94 arranged on the fourth air supply circuit AC4.

Additionally, there may be provided optionally a baseline pressure sensor 90 arranged on the trunk portion AC0.

Figure 4:
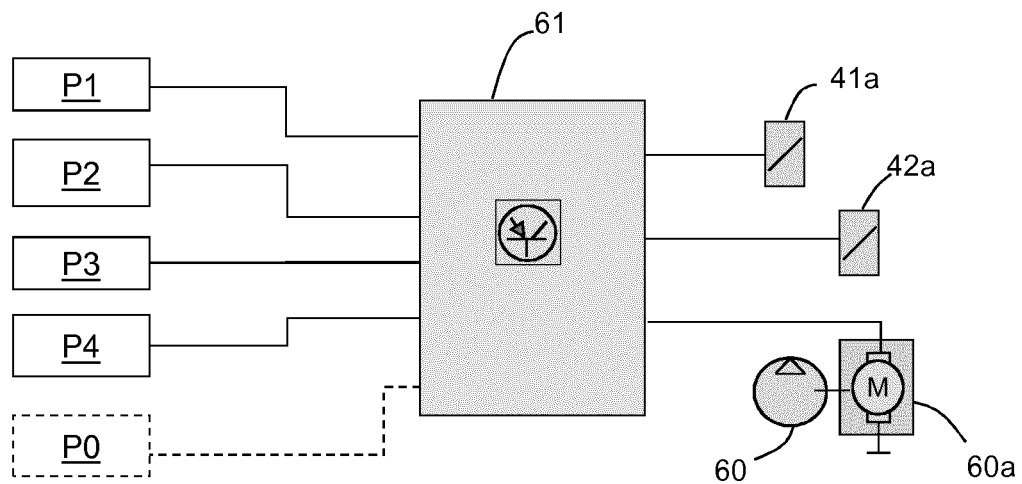
FIG. 4 illustrates an electrical and functional diagram.

As apparent from FIG. 4, the two or more pressure sensors are connected to the control unit 61 of the APM 6. The control unit 61 can control in turn the two or more solenoids 41a, 42a, . . . of the solenoid valves, according to a control logic detailed below. The control unit 61 also controls the electrical motor 60a driving the air compressor 60.

The method carried out in the control unit 61 comprises:
S1/ monitoring, over time, via the values delivered by the first and second pressure sensors (91,92), pressure prevailing in the first and second air supply circuits (AC1,AC2),
S2/ whenever pressure values delivered by first or second pressure (P1,P2) meets a pressure loss criterion, controlling the respective control solenoid (41,42) to cause the respective overflow valve (31,32) to close and remain closed.

Figure 5:
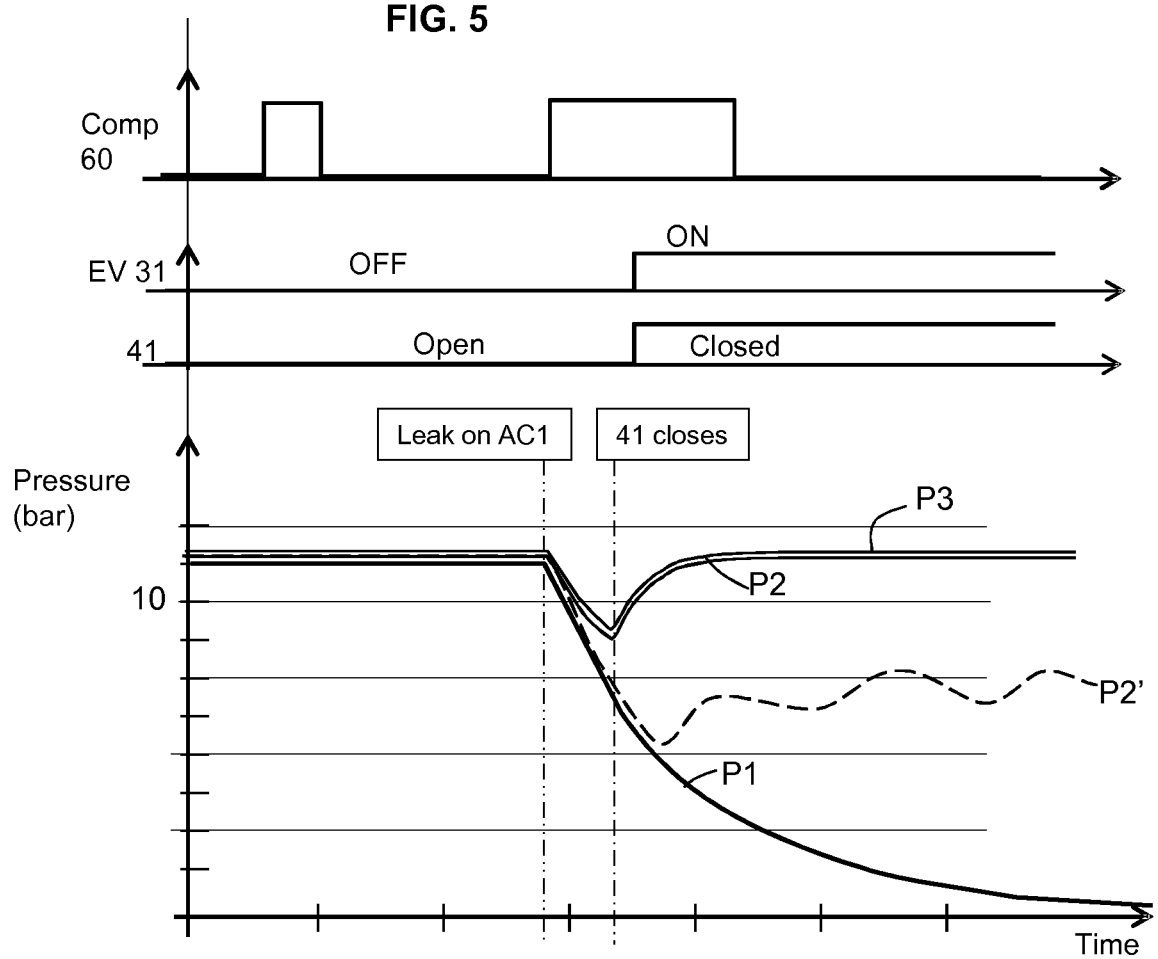
FIG. 5 shows a time chart and illustrates the behavior of the system in case a problem occurs in a portion of the compressed air system.

As shown in FIG. 5, in the case of a substantial leak on the first air supply circuit AC1, the first pressure P1 at 91 drops faster than the two other pressure P2, P3 delivered at 92, 93.

The higher gradient at P1 is identified by the control unit 61. The control unit 61 has a decision making algorithm to prevent false detection. Depending on the current braking phase, the control unit 61 may decide that the gradient at P1 is not due to a braking phase, but rather due to a leak, and therefore the control unit 61 is caused to power the first solenoid valve 41. Consequently, the first overflow valve 41 is pneumatically controlled through the pneumatic control line 47.

As soon as the first overflow valve 41 is closed, the pressure P2, P3 in the two remaining circuits increase again. Therefore, the third air supply circuit AC3 is available and at the standard service pressure to supply, at nominal conditions, the rear axle brake module RBM.

Therefore, 100% braking performance with regard to number of brake applications and braking power is achieved regarding UN ECE R13 § (§ 2.1 of Annex 4) and USA CFR § 571.121 S5.3.1.

By comparison, the dotted line P2' shows the prior art behavior in the absence of pneumatic control for an early closure of the overflow valve of the leaking circuit and in the absence of a third circuit. Under this prior art configuration, the leak on AC1 has a substantial impact on the second circuit AC2, with a pressure P2' substantially lower than the standard service pressure, undermining the braking performance.

The control unit 61 may use either a pressure difference or a pressure gradient to determine which air circuit is the leaking circuit.

The control unit 61 may monitor the difference between first and second pressure (P2-P1). When this difference is greater than a predefined threshold, the circuit exhibiting the lower pressure value is determined to be leaking circuit. Under this condition, the corresponding control solenoid (41,42) is controlled to close the respective overflow valve (31,32). In the examples shown in FIGS. 5 and 8, the control unit 61 causes the first control solenoid 41 to close the first overflow valve 31.

The proposed method may comprise the use of a test routine handled by the control unit 61:

S3/ power first control solenoid 41 to cause the first overflow valve 31 to close, and the control unit 61 monitors the first pressure P1 and if the loss of pressure on first pressure continues for a predetermined time then maintain power on first control solenoid 41 to keep the first overflow valve 31 closed, otherwise unpower first control solenoid 41, S4/ power second control solenoid 42 to cause the second overflow valve 32 to close, and the control unit 61 monitors the second pressure P2 and if the loss of pressure on second pressure continues for a predetermined time then maintain power on second control solenoid 42 to keep the second overflow valve 32 closed, otherwise unpower second control solenoid 42.

Steps S3 and S4 can be used repeatedly.

Figure 8:
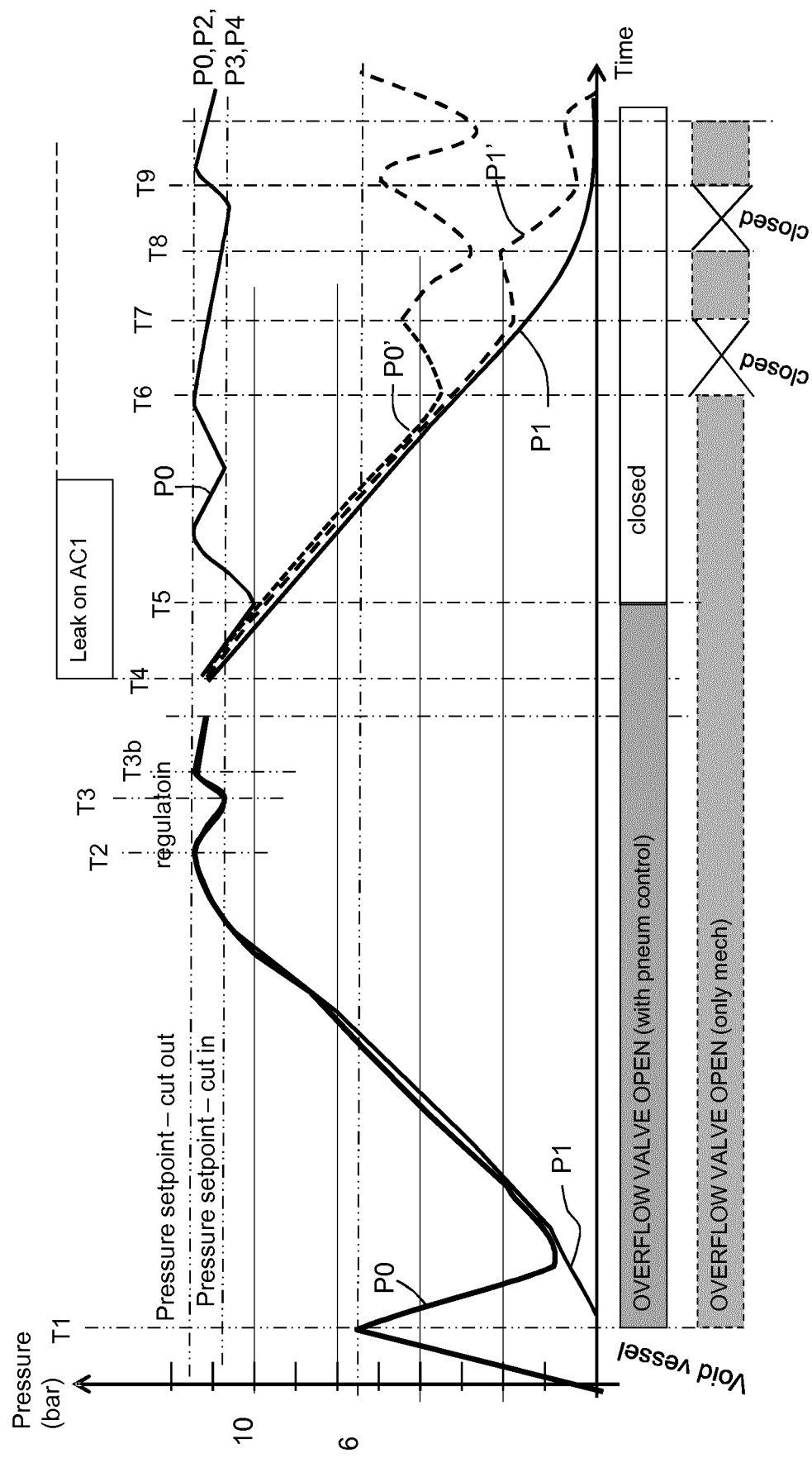
FIG. 8 shows a time chart illustrating a behavior of the disclosed system compared to the prior art.

As illustrated in FIG. 8, starting from the void reservoir R1, when the air compressor starts running, pressure P0 rises fast and this generates the opening of the overflow valve (instant T1). Thereafter, pressure P0 joins pressure P1 and they rise together with a certain time needed to inflate the reservoir R1 and reach standard service pressure. The standard service pressure is then achieved by a known-per-se regulation within an interval defined by [pressure setpoint cut-in, pressure setpoint cut-out] (see FIG. 8). Compressor is stopped at T2 and runs again between T3 and T3b.

We assume a substantial leak occurs on circuit AC1, at instant T4. Both pressure P0, P1 lower simultaneously. The rest of the time chart highlights the difference distinguishing the present invention (P0,P1) versus prior art behavior (P0',P1').

When the overflow valve is controlled as disclosed above by pneumatic control, the control unit 61 causes the closure of the overflow valve at instant T5. Pressure P0 rises again into the regulation interval; P0 delivers then normally the other circuits AC2,AC3 and when relevant AC4 (pressures P2, P3, P4 remain at the normal service pressure) even though pressure P1 decreases to 0.

By contrast, if there is no pneumatic control, pressures P0', P1' lower much more, until the mechanical closure of the overflow valve occurs at instant T6. Thereafter, there is a cycling of the overflow valve between open and close states (closed between instant T6 and T7, opened between T7 and T8 and then closed between instant T8 and T9 . . . ). The mean pressure of P0' is much lower than the normal service pressure, undermining also the pressure at the other air circuits.

Miscellaneous

FIG. 9 shows a variant embodiment wherein, in the illustrated example, each brake actuator is associated with its own brake module, referred to as a wheel brake control unit WBCU. Each wheel brake control unit WBCU is redundantly supplied by two pneumatic circuits, one of them being the third air supply circuit AC3.

Signals S16,S18,S75 can be formed as conventional electrical control signals (wired solution) or can be formed as equivalent databus messages circulating on an onboard multiplex bus (CAN, Ethernet, LIN etc).

The pneumatic brake system mentioned above constitutes the main service brake system of the vehicle which is used to slow down and to stop the vehicle during normal operation, whatever the speed of the vehicle. Besides, the park brake system is used mainly to maintain the vehicle stopped when it is not in use. The park brake system can be least partly combined with the service brake system, nevertheless, a park brake system can be independent of the service brake system, it can for example comprise a system for blocking the vehicle transmission.

Heavy-duty vehicles, such as trucks and buses, are also often equipped with a deceleration system (likewise called 'retarder'), which is only capable of slowing down a vehicle, but often not capable of effectively stopping the vehicle completely within a reasonable distance. Such deceleration systems, such as hydro-dynamic brakes or electro-dynamic brakes, are mostly efficient when the vehicle is riding above a certain speed. Such deceleration systems are by essence different from the pneumatic brake system described above.

The invention claimed is:

1. An electronically controlled pneumatic brake system for an automotive vehicle, the system comprising:
   at least one front axle brake module for providing pneumatic control pressure to left and right front pneumatic brake actuators;
   at least one rear axle brake module for providing pneumatic control pressure to left and right rear pneumatic brake actuators;
   an air production module selectively providing air under pressure to the front and rear axles electronic brake modules via at least a first air supply circuit for the rear axle and a second air supply circuit for the front axle; and
   first and second air reservoirs, respectively coupled to the first and second air supply circuits;
   wherein the system comprises a third reservoir and a third air supply circuit connected to the third reservoir, for providing a redundant pneumatic supply to the at least one front axle brake module and to the at least one rear axle brake module, wherein the third air supply circuit provides substantially the same braking performance as the first air supply circuit for the rear axle at nominal conditions and/or substantially the same braking performance as the second air supply circuit for the front axle at nominal conditions.

2. The brake system of claim 1, comprising:
a first overflow valve arranged at a head section of the first air supply circuit; and
a second overflow valve arranged at a head section of the second air supply circuit;
wherein each of the first and second overflow valves exhibits an open state and a closed state.

3. The brake system of claim 2, comprising:
a first control solenoid, with an output of the first control solenoid coupled to the first overflow valve, and configured to change the first overflow valve to a closed state when pressure is applied from the first control solenoid to the first overflow valve; and
a second control solenoid, with an output of the second control solenoid coupled to the second overflow valve and configured to change the second overflow valve to a closed state when pressure is applied from the second control solenoid to the second overflow valve.

4. The brake system of claim 3, further comprising a first pressure sensor arranged on the first air supply circuit and a second pressure sensor arranged on the second air supply circuit.

5. The brake system of claim 4, wherein the air production module comprises a control unit configured to control the first and second control solenoids, in accordance with a pressure sensed at the first and second pressure sensors.

6. The brake system of claim 3, wherein the first and second control solenoids are pneumatically supplied by a trunk portion of the air production module.

7. The brake system of claim 1, wherein the third reservoir has a volume which is not less than the volume of the first air reservoir and not less than the volume of the second air reservoir.

8. The brake system of claim 1, comprising a third overflow valve arranged at a head section of the third circuit.

9. The brake system of claim 8, comprising a third control solenoid, with an output of the third control solenoid coupled to the third overflow valve, and configured to change the third overflow valve to a closed state when pressure is applied from the third control solenoid to the third overflow valve.

10. The brake system of claim 1, comprising at least a first double check valve configured such that the at least one rear axle electronic brake module is supplied by the first air supply circuit and the third air supply circuit through the first double check valve, and a second double check valve configured such that the at least one front axle electronic brake module is supplied by the second air supply circuit and the third air supply circuit through the second double check valve.

11. The brake system of claim 1, wherein there is provided one axle electronic brake module per axle.

12. A method to control overflow valves in an electronically controlled pneumatic brake system for an automotive vehicle, the method comprising:
monitoring, by a control unit, over time, via a first pressure sensor of the brake system, a first pressure prevailing in a first air supply circuit of the brake system;
monitoring, by the control unit, over time, via a second pressure sensor of the brake system, a second pressure prevailing in a second air supply circuit of the brake system;
an air production module selectively providing air under pressure to front and rear axles electronic brake modules via the first air supply circuit coupled to a first air reservoir for the rear axle, the second air supply circuit coupled to a second air reservoir for the front axle, and a third air supply circuit connected to a third reservoir, for providing a redundant pneumatic supply to the front axle brake module and to the rear axle brake module; and
in response to pressure values delivered by the first or second pressure sensor meeting a pressure loss criterion, controlling a first control solenoid to cause a first overflow valve to close and remain closed, with an output of the first control solenoid coupled to the first overflow valve, and in response to pressure values delivered by the second pressure sensor meeting a pressure loss criterion, controlling a second control solenoid to cause a second overflow valve to close and remain closed, with an output of the second control solenoid coupled to the second overflow valve.

13. The method of claim 12,
wherein the pressure loss criterion is defined as when a pressure difference between the first and second pressure values is greater than a predefined threshold; and
wherein the method further comprises:
determining the circuit exhibiting the lower pressure value is a leaking circuit; and
controlling the corresponding control solenoid to close the respective overflow valve.

14. The method of claim 12, wherein the pressure loss criterion is defined as a pressure gradient; and wherein the method further comprises:
determining the circuit exhibiting the higher pressure gradient is a leaking circuit; and
controlling the corresponding control solenoid to close the respective overflow valves.

15. The method of claim 12, further comprising executing, by the control unit, a test routine sequentially comprising:
powering the first control solenoid to cause the first overflow valve to close;
monitoring the first pressure;
maintaining power on the first control solenoid in response to the loss of pressure on the first pressure for a predetermined time to keep the first overflow valve closed;
unpowering the first control solenoid in response to the loss of pressure on the first pressure not continuing for the predetermined time;
powering the second control solenoid to cause the second overflow valve to close;
monitoring the second pressure;
maintaining power on the second control solenoid in response to the loss of pressure on the second pressure for a predetermined time to keep the second overflow valve closed; and
unpowering the second control solenoid if in response to the loss of pressure on the second pressure not continuing for the predetermined time.

* * * * *